United States Patent
Kang et al.

(10) Patent No.: US 10,638,057 B2
(45) Date of Patent: Apr. 28, 2020

(54) PHOTOGRAPHING DEVICE AND CONTROL METHOD THEREOF

(71) Applicant: Samsung Electronics Co., Ltd, Gyeonggi-do (KR)

(72) Inventors: Tae-hoon Kang, Gyeonggi-do (KR); Dae-gyu Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/382,466

(22) Filed: Dec. 16, 2016

(65) Prior Publication Data

US 2017/0180653 A1 Jun. 22, 2017

(30) Foreign Application Priority Data

Dec. 18, 2015 (KR) ........................ 10-2015-0181853

(51) Int. Cl.
*H04N 5/262* (2006.01)
*H04N 5/77* (2006.01)
(Continued)

(52) U.S. Cl.
CPC ....... *H04N 5/2621* (2013.01); *H04N 5/23216* (2013.01); *H04N 5/23232* (2013.01);
(Continued)

(58) Field of Classification Search
CPC .. H04N 5/2621; H04N 5/23293; H04N 5/351; H04N 7/0127; H04N 5/23216;
(Continued)

(56) References Cited

U.S. PATENT DOCUMENTS

| 7,557,838 B2 * | 7/2009 | Ogikubo .............. | G11B 27/032 348/231.3 |
| 2001/0012067 A1 | 8/2001 | Spitzer et al. | |

(Continued)

FOREIGN PATENT DOCUMENTS

| JP | 2004221999 | 8/2004 |
| KR | 100619291 | 8/2006 |

(Continued)

OTHER PUBLICATIONS

European Patent Office, "European Search Report," Application No. EP 16 20 4325, dated Jun. 6, 2017, 9 pages.
(Continued)

*Primary Examiner* — Timothy J Henn

(57) ABSTRACT

The present disclosure relates to an electronic device for capturing a reproduction speed changing video which is reproducible in all devices without additional encoding, and a control method thereof. The method of controlling an electronic device for capturing a video includes generating, at a first frame rate, a first frame group obtained by photographing a subject, receiving an input for changing a reproduction speed, and determining a second frame rate based on the changed reproduction speed. The method further includes generating, at the second frame rate, a second frame group obtained by photographing the subject, and generating a single video file by encoding the first frame group and the second frame group based on the first frame rate.

16 Claims, 14 Drawing Sheets

(51) Int. Cl.
*H04N 5/783* (2006.01)
*H04N 5/232* (2006.01)
*H04N 9/804* (2006.01)
*H04N 5/351* (2011.01)
*H04N 7/01* (2006.01)

(52) U.S. Cl.
CPC ..... *H04N 5/23245* (2013.01); *H04N 5/23293* (2013.01); *H04N 5/351* (2013.01); *H04N 5/772* (2013.01); *H04N 5/783* (2013.01); *H04N 7/0127* (2013.01); *H04N 9/8045* (2013.01)

(58) Field of Classification Search
CPC .. H04N 5/23232; H04N 5/783; H04N 9/8045; H04N 5/772; H04N 5/23245
See application file for complete search history.

(56) References Cited

U.S. PATENT DOCUMENTS

| | | | |
|---|---|---|---|
| 2003/0146981 A1* | 8/2003 | Bean | H04N 5/232 348/222.1 |
| 2006/0114334 A1 | 6/2006 | Watanabe et al. | |
| 2007/0013808 A1 | 1/2007 | Tagawa | |
| 2007/0189728 A1 | 8/2007 | Yu | |
| 2007/0242139 A1 | 10/2007 | Horita et al. | |
| 2010/0053345 A1 | 3/2010 | Kim et al. | |
| 2010/0265344 A1 | 10/2010 | Verlarde et al. | |
| 2011/0164860 A1 | 7/2011 | Nakagawa | |
| 2014/0099074 A1 | 4/2014 | Kano | |
| 2014/0218604 A1* | 8/2014 | Liu | H04N 5/23216 348/373 |
| 2014/0300769 A1 | 10/2014 | Hartford | |
| 2014/0336796 A1 | 11/2014 | Agnew | |
| 2015/0286875 A1 | 10/2015 | Land et al. | |
| 2016/0225405 A1* | 8/2016 | Matias | G06F 16/78 |
| 2016/0269674 A1* | 9/2016 | Rathore | H04N 7/0105 |

FOREIGN PATENT DOCUMENTS

| | | |
|---|---|---|
| KR | 1020080006084 | 1/2008 |
| KR | 101198157 | 10/2012 |

OTHER PUBLICATIONS

ISA/KR, "International Search Report," Application No. PCT/KR2016/013390, dated Feb. 27, 2017, Korean Intellectual Property Office, Daejeon, Korea, 10 pages.

\* cited by examiner

PHOTOGRAPHING DEVICE AND CONTROL METHOD THEREOF

CROSS-REFERENCE TO RELATED APPLICATION(S) AND CLAIM OF PRIORITY

The present application is related to and claims the benefit of Korean Patent Application No. 10-2015-0181853, filed on Dec. 18, 2015, in the Korean Intellectual Property Office, the disclosure of which is incorporated herein in its entirety by reference.

TECHNICAL FIELD

The present disclosure relates to a photographing device and a control method thereof.

BACKGROUND

Due to the high frequency of capturing videos in daily life by using a portable device, there are various requirements with respect to video reproduction speed. For example, a user may desire to observe partial scenes in detail by reproducing the partial scenes in slow motion while capturing a video of certain scenes. In this case, there is a demand for a single video including a video of a normal reproduction speed and a slow-motion video.

However, when a single video includes a plurality of reproduction speeds, the single video may be normally reproduced but a reproduction speed may only be changed in a specific device and there is a limitation in that additional encoding needs to be performed on the video to enable it to be reproduced in a generic-purpose device.

SUMMARY

To address the above-discussed deficiencies, it is a primary object to provide a photographing device for capturing a reproduction speed changing video which is reproducible in all devices without additional encoding and a control method thereof.

Additional aspects will be set forth in part in the description which follows and, in part, will be apparent from the description, or may be learned by practice of the presented embodiments.

According to an aspect of an embodiment, a method of controlling a photographing device for capturing a video includes: generating, at a first frame rate, a first frame group obtained by photographing a subject; receiving an input for changing a reproduction speed; determining a second frame rate based on the changed reproduction speed; generating, at the second frame rate, a second frame group obtained by photographing the subject; and generating a single video file by encoding the first frame group and the second frame group based on the first frame rate.

The second frame rate may be determined to be less than the first frame rate when the changed reproduction speed is faster than a previous reproduction speed and to be greater than the first frame rate when the changed reproduction speed is slower than the previous reproduction speed.

The second frame rate may be determined as a preset value according to the changed reproduction speed.

The input for changing the reproduction speed may be received automatically according to a predetermined configuration or may be received manually due to manipulation by a user.

The predetermined configuration may be determined based on photographing history data stored in a predetermined database.

The predetermined configuration may be determined based on at least one of whether the subject moves, a moving speed of the subject, a moving direction of the subject, and whether a predetermined motion is detected.

The manually received input may be an input received through a volume control button.

The manually received input may be a touch input received through a touch screen.

The first frame rate may be a default frame rate provided by the photographing device.

The first frame rate may be a default frame rate determined based on a resolution of the video.

According to an aspect of another embodiment, a photographing device for capturing a video includes: an input device configured to receive an input for changing a reproduction speed; and a processor configured to generate, at a first frame rate, a first frame group obtained by photographing a subject, determine a second frame rate based on the changed reproduction speed, generate, at the second frame rate, a second frame group obtained by photographing the subject, and generate a single video file by encoding the first frame group and the second frame group based on the first frame rate.

The second frame rate may be determined to be less than the first frame rate when the changed reproduction speed is faster than a previous reproduction speed and to be greater than the first frame rate when the changed reproduction speed is slower than the previous reproduction speed.

The second frame rate may be determined as a preset value according to the changed reproduction speed.

An input for changing the reproduction speed may be received automatically according to a predetermined configuration or may be received manually due to manipulation by a user.

The predetermined configuration may be determined based on photographing history data stored in a predetermined database.

The predetermined configuration may be determined based on at least one of whether the subject moves, a moving speed of the subject, a moving direction of the subject, and whether a predetermined motion is detected.

The manually received input may be an input received through a volume control button.

The manually received input may be a touch input received through a touch screen.

The first frame rate may be a default frame rate provided by the photographing device.

According to an aspect of another embodiment, a non-transitory computer-readable recording medium stores computer program codes for performing a method of controlling a photographing device for capturing a video, when the method is read and performed by a processor, the method including: generating, at a first frame rate, a first frame group obtained by photographing a subject; receiving an input for changing a reproduction speed; determining a second frame rate based on the changed reproduction speed; generating, at the second frame rate, a second frame group obtained by photographing the subject; and generating a single video file by encoding the first frame group and the second frame group based on the first frame rate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
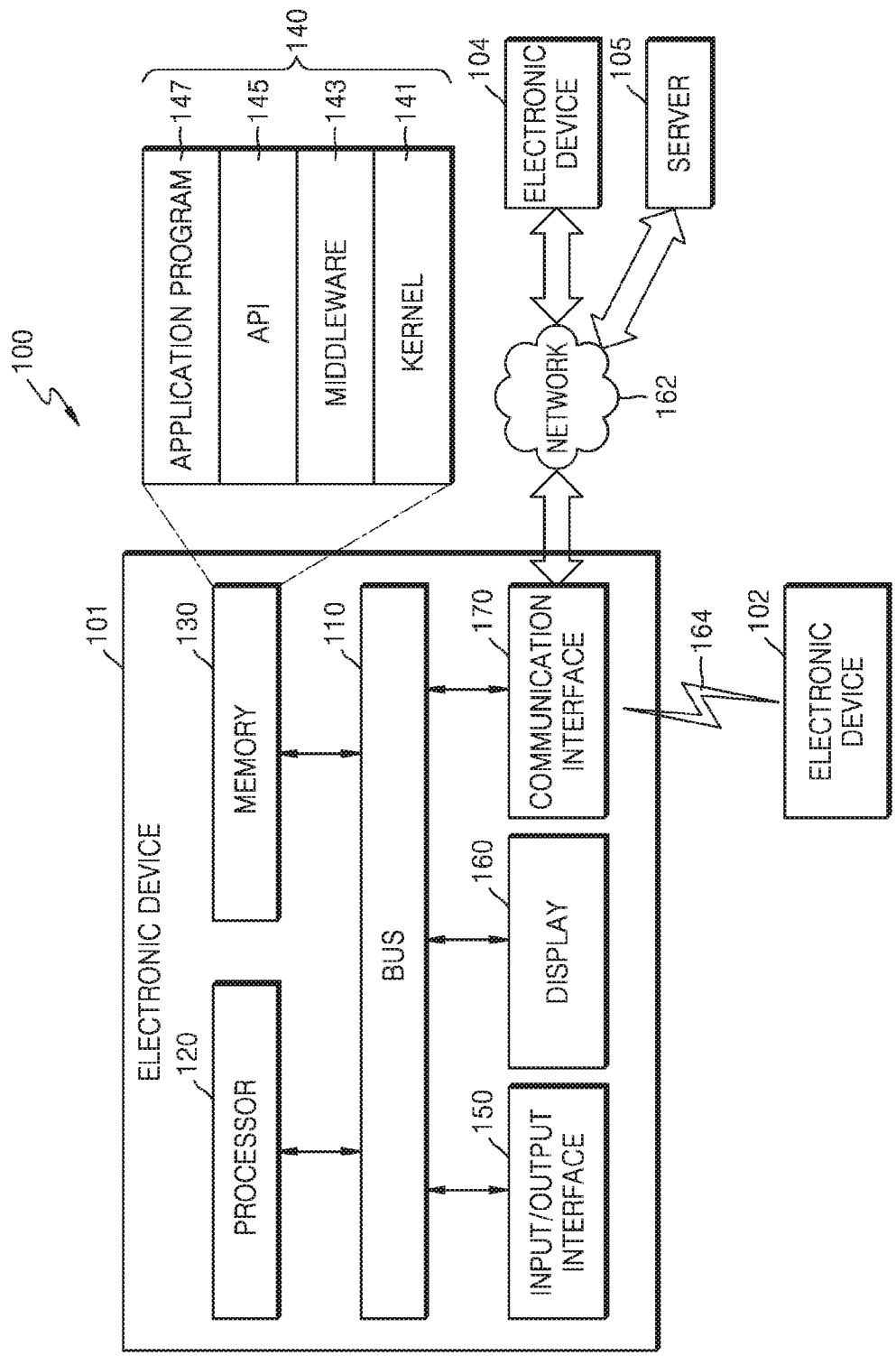
FIG. 1 is a block diagram illustrating an electronic device in a network environment, according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the present specification is drafted with reference to the accompanying drawings, in which various embodiments are shown. However, it is not desired that the techniques disclosed in the present specification are limited to specific carry-out aspects, and it will be understood that various modifications, equivalents, and/or alternatives are also included in the contents of the present specification. In the description of the drawings, like reference numerals may refer to like elements.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

In addition, the term '. . . unit' used in the embodiments indicates a component including software or hardware, such as a Field Programmable Gate Array (FPGA) or an Application-Specific Integrated Circuit (ASIC), and the '. . . unit' performs certain roles. However, the '. . . unit' is not limited to software or hardware. The '. . . unit' may be configured to be included in an addressable storage medium or to reproduce one or more processors. Therefore, for example, the '. . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and '. . . units' may combine them into a smaller number of components and '. . . units' or further divide them into additional components and '. . . units'.

In the present specification, a mobile device indicates a relatively small-sized computer device which is portable by a user, and may include, for example, a cellular phone, a personal digital assistant (PDA), or a laptop computer.

In the present specification, the expression "have", "may have", "include", or "may include" indicates the existence of corresponding features (for example, numeric values, functions, operations, or components of parts) and does not exclude the existence of an additional feature.

In the present specification, the expression "A or B", "at least one of A or/and B", or "one or more of A or/and B" may include all possible combinations of listed items. For example, "A or B", "at least one of A or/and B", or "one or more of A or/and B" may indicate (1) a case of including at least one of A, (2) a case of including at least one of B, or (3) a case of including all of at least one of A and at least one of B.

The expressions, such as "first" and "second", used in the present specification can be used to describe various elements without regarding to sequence and/or importance and do not limit corresponding elements but are used only to classify a certain element from another element. For example, first user equipment and second user equipment may indicate different pieces of user equipment without regard to sequence or importance. For example, a first element may be referred to as a second element without going beyond the right scope of the present specification, and likewise, the second element may be referred to as the first element.

When it is described that a certain element (e.g., a first element) is "(operatively or communicatively) coupled with/to" or "connected to" another element (e.g., a second element), it should be understood that the certain element may be connected to another element directly or via another element (e.g., a third element) in the middle. In contrast, when a certain element (e.g., a first element) is "directly connected" or "directly linked" to another element (e.g., a second element), it should be understood that any other element (e.g., a third element) does not exist in the middle.

The expressions "configured to" used in the present specification may be replaced with, for example, "suitable for", "having the capacity to", "designed to", adapted to", "made to", or "capable of" in accordance with circumstances. The term "configured to" does not necessarily indicate only "specifically designed to" in the hardware meaning. Instead, the expression "device configured to" may indicate the device "capable of" together with other devices or parts. For example, the wording "processor configured to perform A, B, and C" may indicate an exclusive processor (e.g., an embedded processor) for performing corresponding operations or a generic-purpose processor (e.g., a central processing unit (CPU) or an application processor) capable of performing corresponding operations by executing one or more software programs stored in a memory device.

In the present specification, the term "frame" may indicate each still photograph constituting a video.

In the present specification, the term "frame rate" indicates a speed at which a display device displays frames and may be mainly represented by the number of frames viewed for one second, i.e., a frame per second (FPS) unit. Commonly, the more the number of frames viewed for one second is, the more smoothly a motion of a subject may be expressed.

In the present specification, the term "frame group" may indicate a set of a plurality of frames captured during a predetermined interval.

In the present specification, the term "reproduction speed changing video" may indicate a video including at least one section in which a reproduction speed is changed. For example, the reproduction speed changing video may be reproduced at a normal speed, reproduced in a slow motion only for a partial section, and then reproduced at the normal speed again.

The terminology used in the present specification is used only to describe specific embodiments and may not have any intention to limit the scope of other embodiments. An expression in the singular may include an expression in the plural unless they are clearly different from each other in context. All terms used herein including technical or scientific terms have the same meaning as those generally understood by those of ordinary skill in the art to which the present specification belongs. It should be understood that terms generally used, which are defined in a dictionary, have the same meaning as in context of related technology, and the terms are not to be understood as having an ideal or excessively formal meaning unless they are clearly defined in the present specification.

A photographing device according to various embodiments of the present specification may include at least one of, for example, a smartphone, a tablet personal computer (PC), a mobile phone, a video phone, an e-book reader, a desktop (PC), a laptop (PC), a netbook computer, a workstation, a server, a PDA, a portable multimedia player (PMP), an MP3 player, a mobile medical device, a camera, and a wearable device. According to various embodiments, the wearable device may include at least one of an accessory type device (e.g., a watch, a ring, a bracelet, an ankle bracelet, a necklace, glasses, a contact lens, or a head mounted device (HMD)), a fabric or cloth integrated type device (e.g., an electronic cloth), a body attached type device (e.g., a skin pad or a tattoo), and a bio-implant type device (e.g., an implantable circuit).

In certain embodiments, the photographing device may be a home appliance. The home appliance may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, TV boxes (e.g., SAMSUNG HomeSync™, Apple TV™, and Google TV™), game consoles (e.g., Xbox™ and PlayStation™), an electronic dictionary, an electronic key, a camcorder, and an electronic frame.

In another embodiment, the photographing device may include at least one of various types of medical devices (for example, various types of portable medical measurement devices (e.g., a blood sugar meter, a heart rate meter, a blood pressure meter, and a thermometer), a magnetic resonance angiography (MRA) device, a magnetic resonance imaging (MRI) device, a computed tomography (CT) device, and an ultrasonic wave machine), a navigation machine, a global navigation satellite system (GNSS), an event data recorder (EDR), a flight data recorder (FDR), a vehicle infotainment device, vessel electronic devices (e.g., a vessel navigation machine and a gyro compass), an avionics device, a security device, a vehicle head unit, an industrial or home robot, an automated teller machine (ATM) for financial institutions, a point of sales (POS) for stores, and Internet of Things (IoT) devices (e.g., a lightbulb, various types of sensors, an electric or gas meter, a sprinkler device, a fire alarm, a thermostat, a streetlight, a toaster, fitness equipment, a heater, and a boiler).

According to a certain embodiment, the photographing device may include at least one of a portion of furniture or a building/structure, an electronic board, an electronic signature receiving device, a projector, and various types of measurement devices (e.g., tap water, electricity, gas, and electronic wave measurement devices). In various embodiments, the photographing device may be the various devices described above, taken alone or in combination. According to a certain embodiment, the photographing device may be a flexible electronic device. In addition, the photographing device according to an embodiments of the present specification is not limited to the devices described above and may include new electronic devices along with the development of technology.

Hereinafter, a photographing device according to various embodiments is described with reference to the accompanying drawings. In the present specification, the term "user" may indicate a person using the photographing device or a device (e.g., an artificial intelligence (AI) electronic device) using the photographing device.

FIG. 1 is a block diagram of an electronic device 101 in a network environment, according to various embodiments. The photographing device 101 may include a bus 110, a processor 120, a memory 130, an input/output interface 150, a display 160, and a communication interface 170. In a certain embodiment, the photographing device 101 may omit at least one of the components or additionally include other components.

The bus 110 may include a circuit for connecting the components 120-170 to each other and delivering communication (e.g., a control message and/or data) between the components 120-170.

The processor 120 may include one or more of a CPU, an application processor (AP), and a communication processor (CP). The processor 120 may perform, for example, computation or data processing related to control and/or communication of at least one other component of the photographing device 101.

The memory 130 may include volatile and/or nonvolatile memories. The memory 130 may store, for example, instructions or data related to at least one other component of the photographing device 101. According to an embodiment, the memory 130 may store software and/or a program 140.

The program 140 may include, for example, a kernel 141, middleware 143, an application programming interface (API) 145, an application program (or "application") 147, and/or the like. At least some of the kernel 141, the middleware 143, and the API 145 may be referred to as an operating system (OS).

The input/output interface 150 may act as, for example, an interface capable of delivering a command or data input from another external device to other component(s) of the photographing device 101. Also, the input/output interface 150 may output a command or data received from other component(s) of the photographing device 101 to a user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may display, for example, various types of content (e.g., a text, an image, a video, an icon, and a symbol) to the user. The display 160 may include a touch screen and may receive, for example, a touch, gesture, proximity, or hovering input using an electronic pen or a portion of the body of the user.

The communication interface 170 may configure, for example, communication between the photographing device 101 and an external device (e.g., a first external electronic device 102, a second external electronic device 104, or a server 105). For example, the communication interface 170 may communicate with an external device (e.g., the second external electronic device 104 or the server 105) by being connected to a network 162 by means of wireless communication or wired communication.

The wireless communication may use, as a cellular communication protocol, at least one of, for example, long-term evolution (LTE), LTE Advanced (LTE-A), code division multiple access (CDMA), wideband CDMA (WCDMA), universal mobile telecommunications system (UMTS), Wireless Broadband (WiBro), and global system for mobile communications (GSM). Also, the wireless communication may include, for example, short-range communication 164. The short-range communication 164 may include, at least one of, for example, wireless fidelity (WiFi®), Bluetooth®, near field communication (NFC), and GNSS. The GNSS may include, at least one of, for example, global positioning system (GPS), Global Navigation Satellite System (GLONASS), Beidou navigation satellite system (hereinafter "Beidou") and Galileo, the European global satellite-based navigation system. Hereinafter, in the present specification, "GPS" may be interchangeably used with "GNSS". The wired communication may include at least one of, for example, universal serial bus (USB), high definition multimedia interface (HDMI), recommended standard 232 (RS-232), and plain old telephone service (POTS). The network 162 may include at least one of telecommunications networks, for example, a computer network (e.g., a local area network (LAN) or a wide area network (WAN)), the Internet, and a telephone network.

Each of the first and second external electronic devices 102 and 104 may be the same type as or different from that of the photographing device 101. According to an embodiment, the server 105 may include a group of one or more servers. According to various embodiments, all or some of operations executed by the photographing device 101 may be executed by one or more other electronic devices (e.g., the first and second external electronic devices 102 and 104 and the server 105). According to an embodiment, when the photographing device 101 is supposed to execute a certain function or service automatically or in response to a request, the photographing device 101 may request another device (e.g., the first or second external electronic device 102 or 104 or the server 105) for at least a partial function related to the certain function or service additionally or instead of the execution by the photographing device 101. Another device (e.g., the first or second external electronic device 102 or 104 or the server 105) may execute the requested function or additional function and deliver a result of the execution to the photographing device 101. The photographing device 101 may provide the requested function or service by providing the received result as it is or additionally processing the received result. To this end, for example, a cloud computing, distributed computing, or client-server computing technique may be used.

Figure 2:
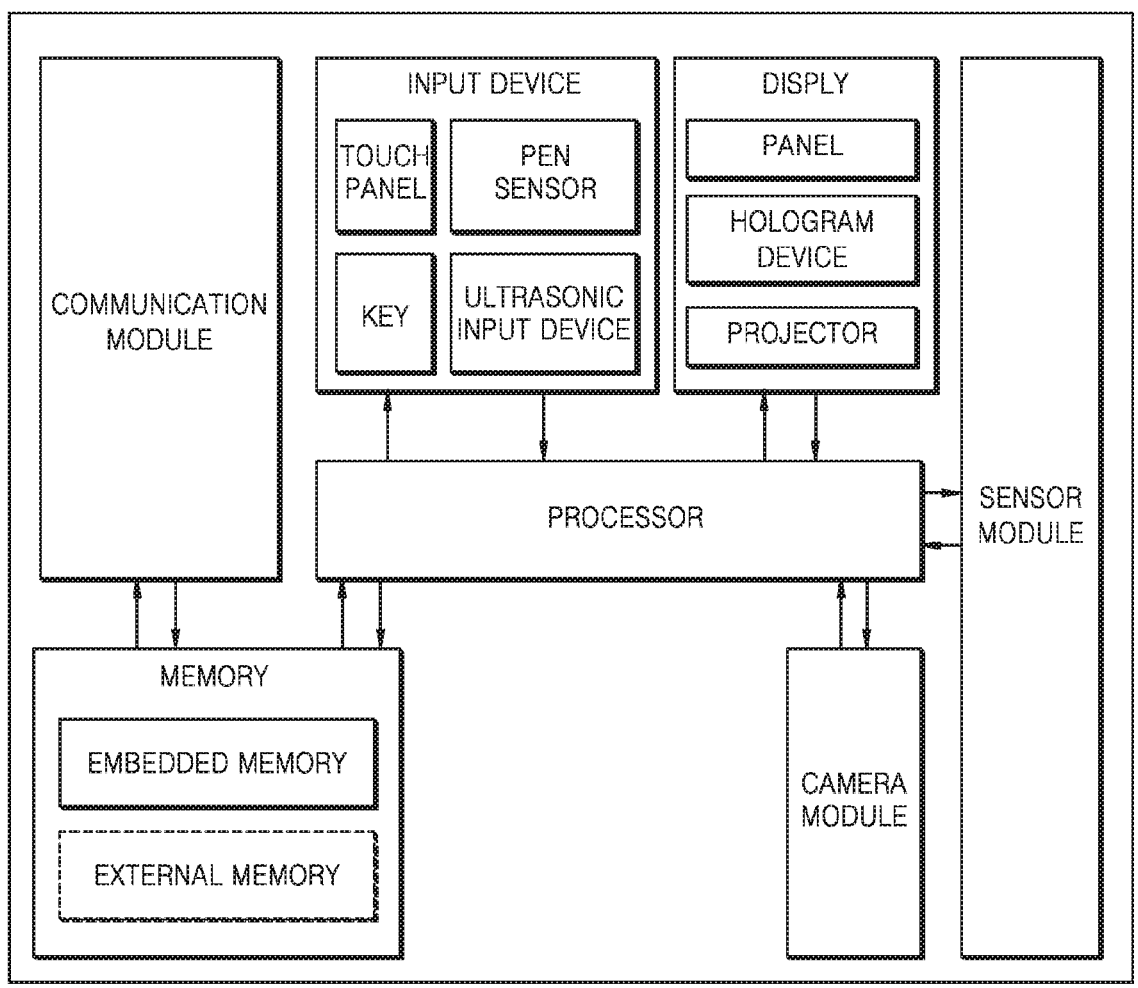
FIG. 2 is a block diagram illustrating an electronic device according to various embodiments of the present disclosure.

FIG. 2 is a block diagram of a photographing device 201 according to various embodiments. The photographing device 201 may include, for example, all or some of the electronic device 101 shown in FIG. 1. The photographing device 201 may include at least one processor (e.g., an AP) 210, a communication module 220, a memory 230, a sensor module 240, an input device 250, a display 260, and a camera module 291.

The processor 210 may control a plurality of hardware or software components connected to the processor 210 by operating, e.g., an OS or an application program, and process and compute various kinds of data. The processor 210 may be implemented by, for example, a system on chip (SoC). According to an embodiment, the processor 210 may further include a graphic processing unit (GPU) and/or an image signal processor. The processor 210 may include at least some of the components shown in FIG. 2. The processor 210 may load a command or data received from at least one of other components (e.g., a nonvolatile memory) on a volatile memory and process the loaded command or data, and store various kinds of data in the nonvolatile memory.

The communication module 220 may have the same or similar configuration as that of the communication interface 170 of FIG. 1.

The memory 230 (e.g., the memory 130) may include, for example, an embedded memory 232 or an external memory 234.

The sensor module 240 may, for example, measure a physical quantity or detect an operating state of the photographing device 201 and convert the measured or detected information into an electrical signal. The input device 250 may include, for example, a touch panel 252, a (digital) pen sensor 254, a key 256, or an ultrasonic input device 258. The touch panel 252 may use at least one of, for example, capacitive, resistive, infrared, and ultrasonic schemes. Also, the touch panel 252 may further include a control circuit. The touch panel 252 may further include a tactile layer to provide a tactile reaction to the user.

The (digital) pen sensor 254 may include, for example, a recognition sheet which is a portion of the touch panel 252 or is separate from the touch panel 252. The key 256 may include, for example, a physical button, an optical key, or a keypad. The ultrasonic input device 258 may detect ultrasonic waves generated by an input tool, through a microphone, and confirm data corresponding to the detected ultrasonic waves.

The display 260 (e.g., the display 160) may include a panel 262, a hologram device 264, or a projector 266. The camera module 291 is, for example, a device capable of capturing a still image and a video and may include, according to an embodiment, one or more image sensors (e.g., a front sensor or a rear sensor), a lens, an image signal processor (ISP) and a flash (e.g., an LED or a xenon lamp).

Each of the components described in the present specification may include one or more parts, and a name of a corresponding component may vary according to a type of the photographing device 201. According to various embodiments, the photographing device 201 may include at least one of the components described in the present specification and may omit some components or further include other additional components. Also, according to various embodiments, some of the components of the photographing device 201 may be combined into a single entity, thereby performing the same functions of the corresponding components before the combination.

Figure 3:
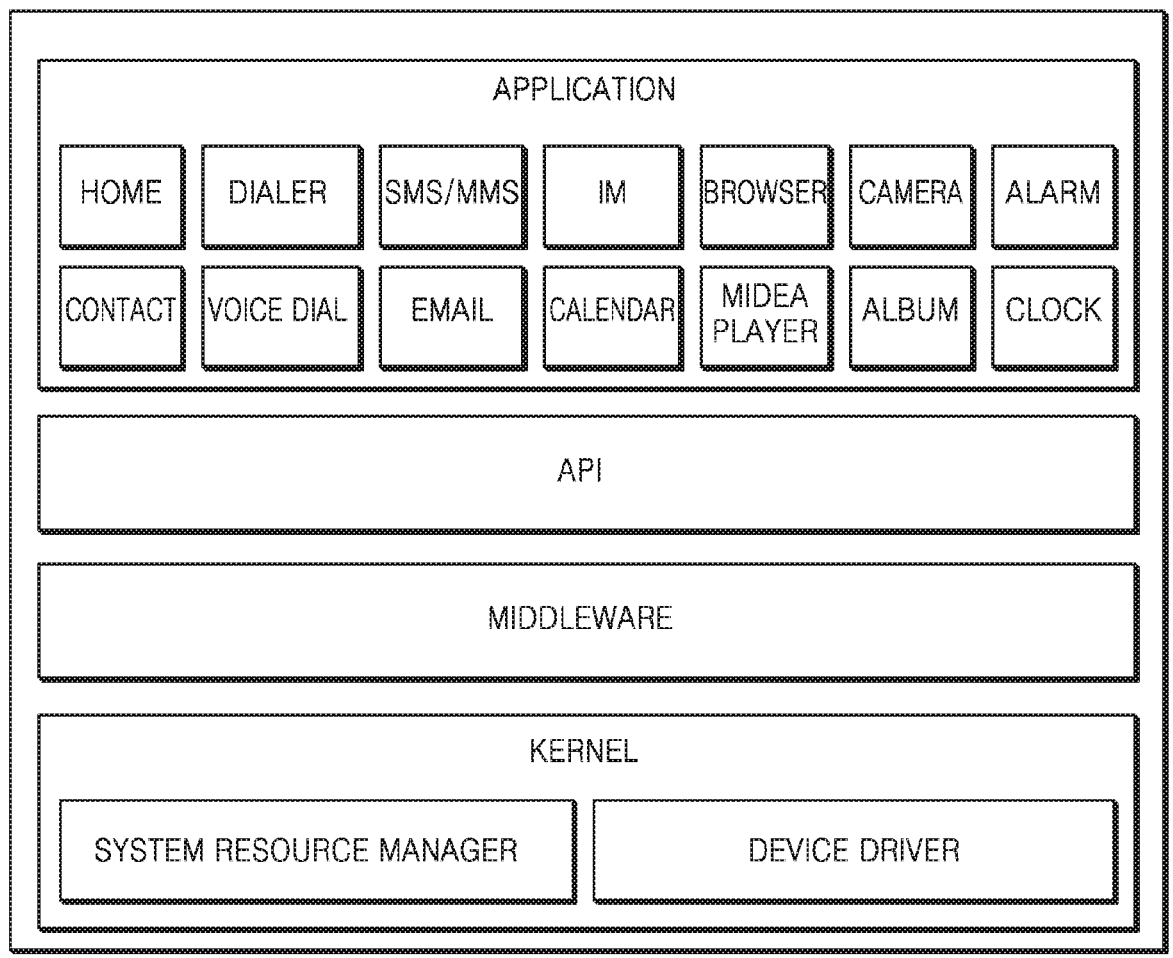
FIG. 3 is a block diagram illustrating a program module according to various embodiments of the present disclosure.

FIG. 3 is a block diagram of a program module 310 according to various embodiments. According to an embodiment, the program module 310 (e.g., the program 140) may include an OS for controlling resources related to an electronic device (e.g., the photographing device 101) and/or various applications (e.g., the application program 147) operating on the OS. The program module 310 may include a kernel 320, middleware 330, an API 360, and/or an application 370. The kernel 320 (e.g., the kernel 141) may include, for example, a system resource manager 321 and/or a device driver 323. The middleware 330 may, for example, provide a function commonly required for the application 370 or provide various functions to the application 370 through the API 360 so that the application 370 efficiently uses limited system resources inside the electronic device.

The API 360 (e.g., the API 145) is, for example, a set of API programming functions and may be provided as a different configuration depending on an OS. The application 370 (e.g., the application program 147) may include one or more applications capable of performing functions, for example, home 371, dialer 372, short message service (SMS)/multimedia message service (MMS) 373, instant messaging (IM) 374, browser 375, camera 376, alarm 377, contact 378, voice dial 379, email 380, calendar, 381, media player 382, album 383, clock 384, healthcare or environment information provision.

At least some of devices (e.g., modules or functions thereof) or methods (e.g., operations) according to various embodiments may be implemented by, for example, instructions stored in a non-transitory computer-readable storage medium in the form of program module. A module or program module according to various embodiments may include at least one of the components described above, omit some thereof, or further include other additional components. Operations performed by a module, a program module, or another component may be executed by a sequential, parallel, repetitive, or heuristic method. Also, some operations may be executed in a different sequence or omitted, or other operations may be added.

Figure 4:
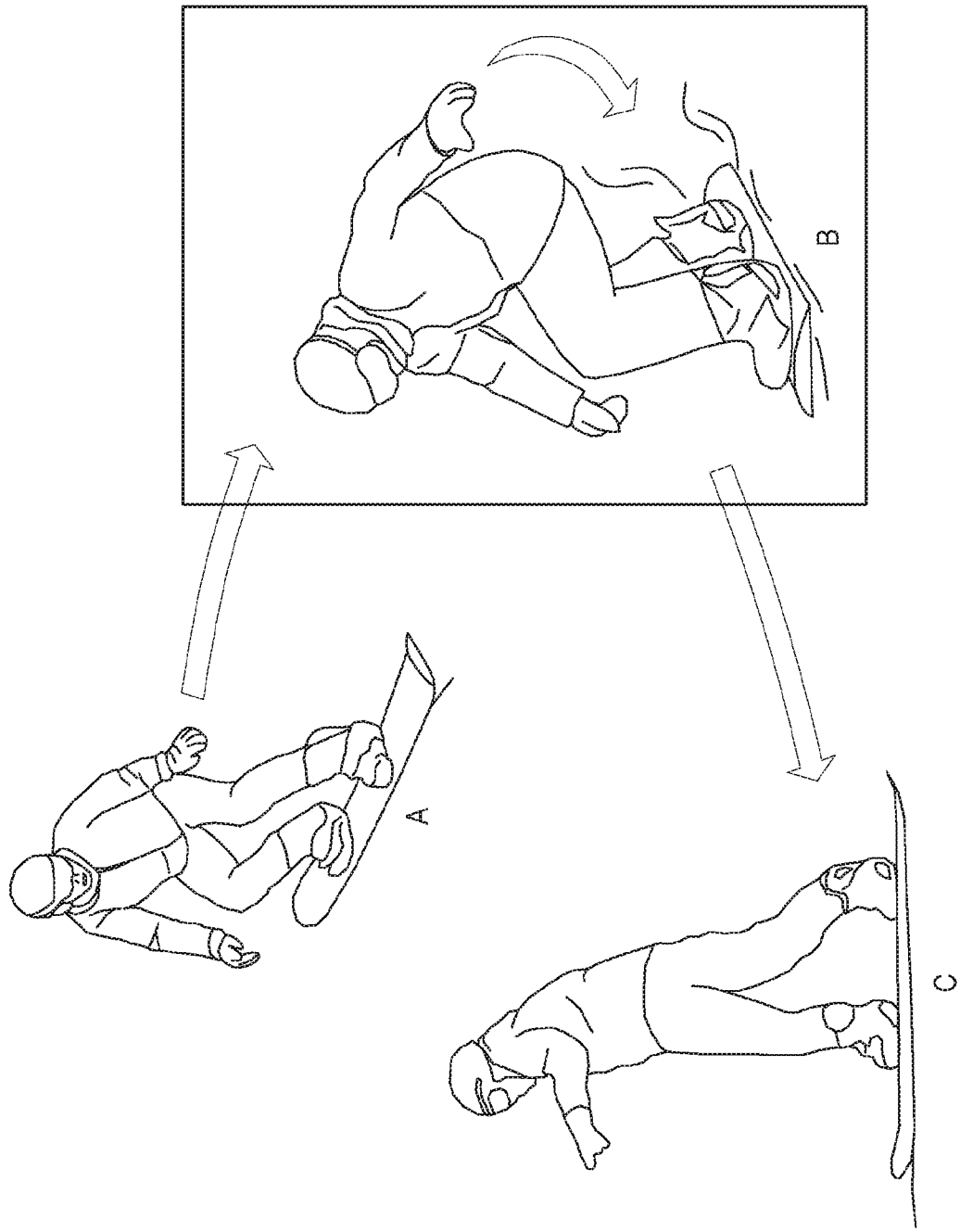
FIG. 4 illustrates using a reproduction speed changing video, according to various embodiments of the present disclosure.

FIG. 4 illustrates a case in which capturing of a reproduction speed changing video is necessary. When a user views a video in which boarding scenes of a snow boarder are captured, the user may view a normal video which is reproduced at a normal speed. However, the user may desire to view a specific operation in detail more slowly according to circumstances.

For example, the user who learns to ride a snow board for the first time may desire to view, while viewing the video being reproduced at the normal speed, a turn activity B in which the snow boarder changes a boarding direction.

When the boarding scenes of a snow boarder are captured in a reproduction speed changing video, the video may be reproduced at the normal speed (A), reproduced in slow motion for only the turn activity (B), and then reproduced at the normal speed (C) again after the turn activity.

According to another embodiment, the reproduction speed changing video may be reproduced at the normal speed, reproduced in a fast motion for only a certain activity, and then reproduced at the normal speed again. According to another embodiment, the reproduction speed changing video may include both a section in which the video is reproduced in the slow motion and a section in which the video is reproduced in the fast motion.

The reproduction speed changing video in the present specification is generated by reflecting reproduction speed changing contents during video capturing and is also generated in the form of normal video without requiring separate encoding and is thus reproducible by any player.

That is, a photographing device in the present specification generates a video in which a reproduction speed change is reflected at the moment when the video is captured instead of adjusting a reproduction speed at the moment when the video is reproduced, and thus, conventional problems in which separate encoding is required at the moment when a video is reproduced and in which the video is reproducible only by a player capable of performing appropriate encoding for adjusting a reproduction speed, at the moment when the video is reproduced may be solved.

According to an embodiment, the photographing device may capture a video in a normal frame rate mode until the snow boarder arrives at a location B after starting at a location A, capture the video in a high frame rate mode near the location B such that the video may be reproduced in the slow motion, and capture the video in the normal frame rate mode again until the snow boarder arrives at a location C after passing the location B. The video captured in the normal frame rate mode may be reproduced at the normal speed, and the video captured in the high frame rate mode may be reproduced in the slow motion. A detailed description thereof will be described below.

Figure 5:
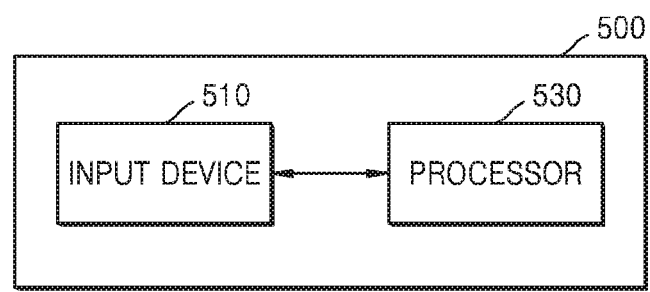
FIG. 5 is a block diagram illustrating an electronic device according to an embodiment of the present disclosure.

FIG. 5 is a block diagram of a photographing device 500 according to an embodiment. The photographing device 500 may include an input device 510 and a processor 530.

The input device 510 may receive an input for changing a reproduction speed while capturing a video. The input for changing the reproduction speed may be received automatically according to a predetermined configuration or manually due to manipulation by a user.

For example, the input device 510 may automatically configure the reproduction speed based on photographing history data stored in a database. Alternatively, the input device 510 may automatically configure the reproduction speed based on whether a subject moves, a moving speed of the subject, a moving direction of the subject, and whether a predetermined motion is detected. However, a method of automatically configuring the reproduction speed is not limited thereto.

The input device 510 may manually receive the input for changing the reproduction speed, through manipulation by the user of a volume control button of a cellular phone or a smartphone. Alternatively, the input device 510 may receive the input for changing the reproduction speed from the user through a touch input received through a touch screen.

The processor 530 may generate, at a first frame rate, a first frame group obtained by photographing a subject, determine a second frame rate based on a changed reproduction speed, generate, at the second frame rate, a second frame group obtained by photographing the subject, and generate a single video file by encoding the first frame group and the second frame group based on the first frame rate.

The processor 530 may generate, at the first frame rate, frames obtained by photographing the subject. According to some embodiments, the first frame rate may be a default frame rate provided by the photographing device 500. According to other embodiments, the first frame rate may be a default frame rate determined based on a resolution of a video being captured.

For example, the processor 530 may photograph the subject for a predetermined time at a speed of 60 frames per second (60 FPS) to capture the video. In this case, the first frame rate may be 60 FPS, and frames captured for the predetermined time may belong to the first frame group.

The processor 530 may determine the second frame rate based on a changed reproduction speed according to a reproduction speed change input received through the input device 510. The processor 530 may determine the second frame rate to be less than the first frame rate as the changed reproduction speed is faster than a previous reproduction speed and to be greater than the first frame rate as the changed reproduction speed is slower than the previous reproduction speed.

For example, the processor 530 may determine the second frame rate as 120 FPS when the changed reproduction speed is a slow motion of a double speed and the first frame rate is 60 FPS. Alternatively, the processor 530 may determine the second frame rate as 240 FPS when the changed reproduction speed is a slow motion of a four-times speed and the first frame rate is 60 FPS. Alternatively, the processor 530 may determine the second frame rate as 30 FPS when the changed reproduction speed is a fast motion of a double speed and the first frame rate is 60 FPS.

The processor 530 may generate frames by continuously photographing the subject at the determined second frame rate. That is, the processor 530 may capture a video at the first frame rate, determine the second frame rate based on a changed reproduction speed when an input for changing a reproduction speed is received through the input device 510, and continuously capture the video at the determined second frame rate. A set of frames generated for a time for which the video is captured at the second frame rate may be the second frame group.

The processor 530 may generate a single video file by encoding both the first frame group and the second frame group based on the first frame rate.

In the generated video file, an actual moving speed of the subject is reflected, as it is, to a portion in which the first frame group generated at the first frame rate is encoded at the first frame rate, and thus, this portion may be reproduced at the normal reproduction speed.

However, a portion in which the second frame group generated at the second frame rate is encoded at the first frame rate may be reproduced in the fast or slow motion. A detailed description of the case in which the second frame group is reproduced in the fast motion and the case in which the second frame group is reproduced in the slow motion will be described below with reference to FIGS. 6 and 7.

According to some embodiments, the processor 530 may include an image sensor configured to generate, at the first frame rate, the first frame group obtained by photographing the subject, determine the second frame rate based on a changed reproduction speed, and generate, at the second frame rate, the second frame group obtained by photographing the subject and a digital signal processor (DSP) configured to generate a single video file by encoding the first frame group and the second frame group based on the first frame rate.

In the present embodiment, the input device 510 and the processor 530 are shown as separate configuration units, but according to some embodiments, the unit 510 and the processor 530 may be combined and implemented as the same configuration unit.

In addition, although the input device 510 and the processor 530 are shown as separate configuration units adjacently located inside the photographing device 500 in the present embodiment, devices taking charge of respective functions of the input device 510 and the processor 530 do not have to be necessarily physically adjacent to each other, and thus, the input device 510 and the processor 530 may be distributed according to embodiments.

In addition, since the photographing device 500 is not limited to a physical device, some functions of the photographing device 500 may be implemented by software instead of hardware.

Figure 6:
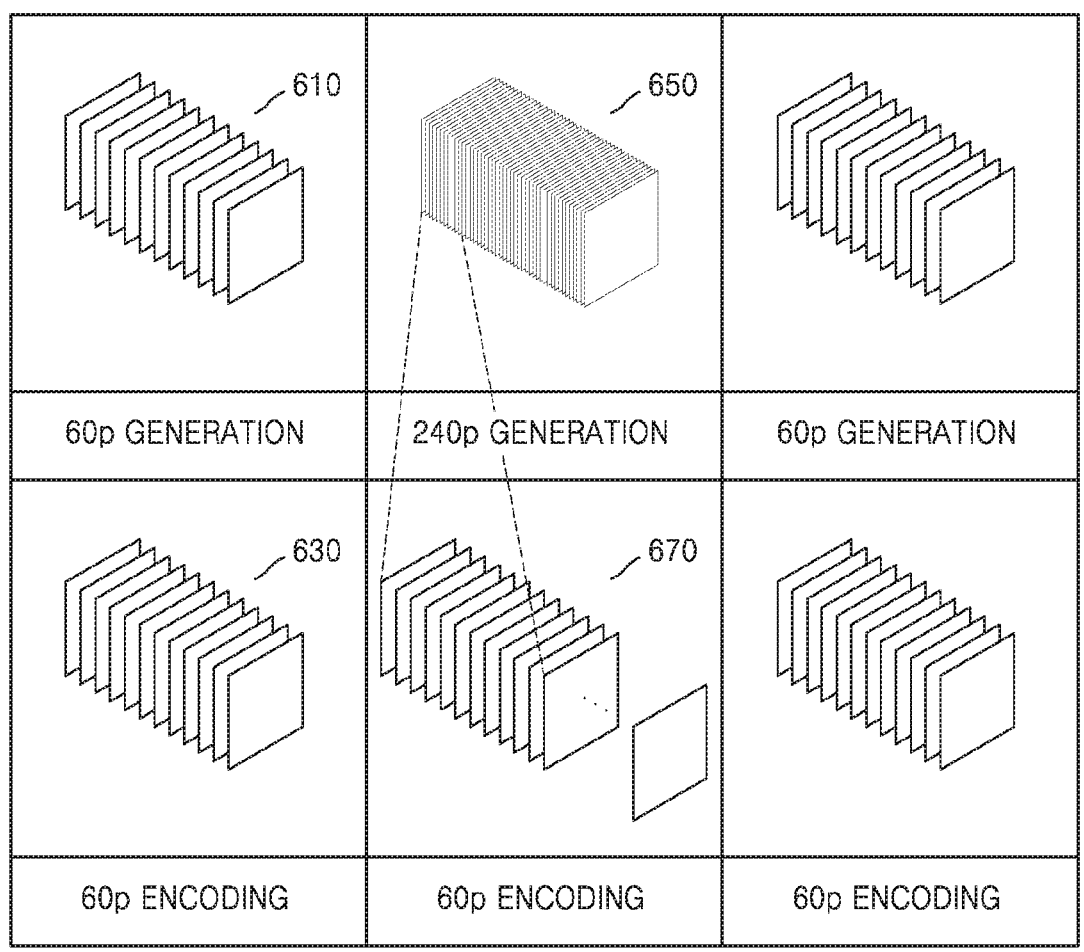
FIG. 6 illustrates generating and encoding frames when a slow motion video is captured, according to an embodiment of the present disclosure.

FIG. 6 illustrates generating and encoding frames when a slow motion video is captured, according to an embodiment. The photographing device 500 may generate a single video file by encoding both the first frame group and the second frame group based on the first frame rate.

In the generated video file, an actual moving speed of the subject is reflected, as it is, to a portion in which the first frame group generated at the first frame rate is encoded at the first frame rate, and thus, this portion may be reproduced at the normal reproduction speed. For example, when a video portion captured (610) at a speed of 60 frames per second is encoded (630) at the same speed, 60 frames are reproduced for one second for this video portion, and thus, this video portion may be reproduced at the same speed as the actual moving speed of the subject.

However, a portion in which the second frame group generated at the second frame rate is encoded at the first frame rate may be reproduced in the slow motion. For example, when a video portion captured (650) at a speed of 240 frames per second is encoded (670) at a speed of 60 frames per one second, a motion for one second is reproduced for four seconds as if a motion for four seconds occurred, and thus, this video portion may be reproduced in the slow motion.

Furthermore, the video file generated by encoding both the first frame group and the second frame group based on the first frame rate is a file generated at one same frame rate, and thus a general reproduction device which cannot reproduce variable frames may also reproduce the generated video file. Therefore, the photographing device 500 in the present embodiment may generate a video which is reproducible by all reproduction devices without separate encoding and of which a reproduction speed changes.

Figure 7:
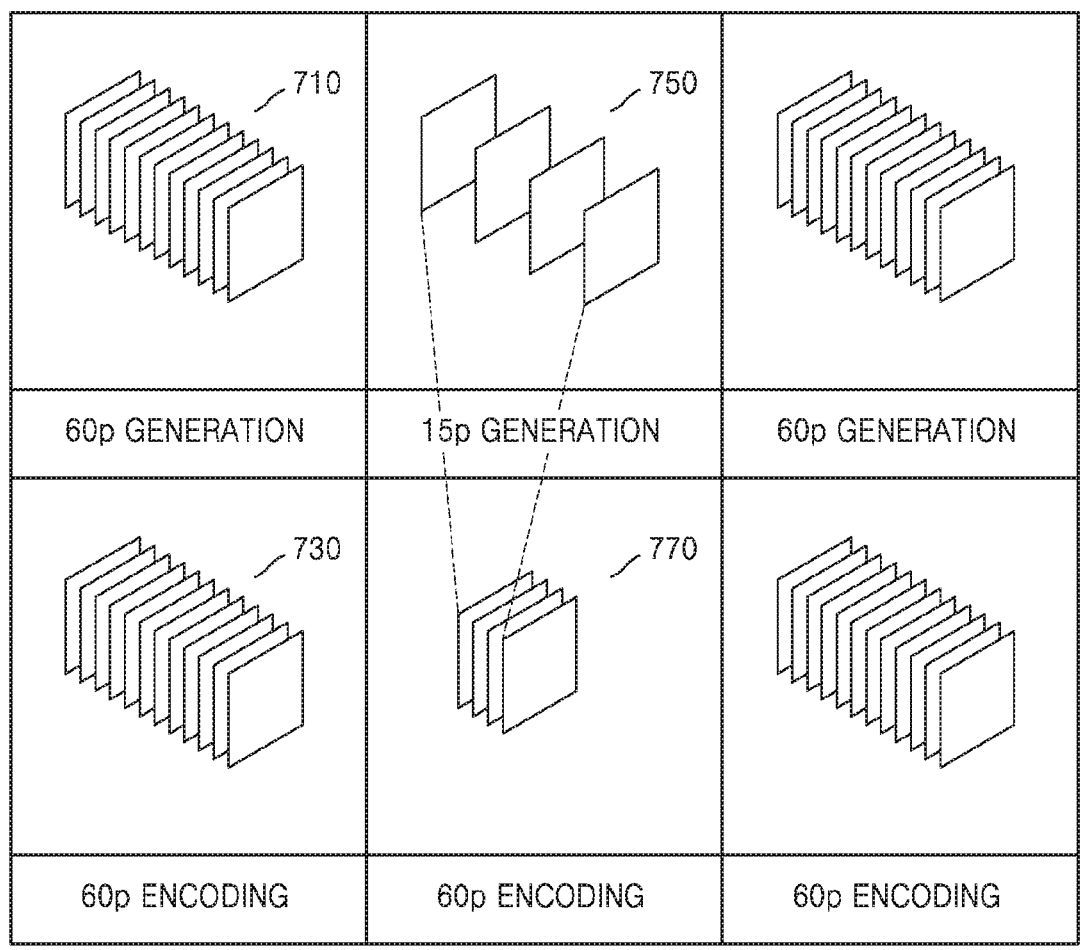
FIG. 7 illustrates generating and encoding frames when a fast motion video is captured, according to an embodiment of the present disclosure.

FIG. 7 illustrates generating and encoding frames when a fast motion video is captured, according to an embodiment. The photographing device 500 may generate a single video file by encoding both the first frame group and the second frame group based on the first frame rate.

In the generated video file, an actual moving speed of the subject is reflected, as it is, to a portion in which the first frame group generated at the first frame rate is encoded at the first frame rate, and thus, this portion may be reproduced at the normal reproduction speed. For example, when a video portion captured (710) at a speed of 60 frames per second is encoded (730) at the same speed, 60 frames are reproduced for one second for this video portion, and thus, this video portion may be reproduced at the same speed as the actual moving speed of the subject.

However, a portion in which the second frame group generated at the second frame rate is encoded at the first frame rate may be reproduced in the fast motion. For example, when a video portion captured (750) at a speed of 15 frames per second is encoded (770) at a speed of 60 frames per second, a motion for one second is reproduced for one fourth of a second as if a motion for one fourth of a second occurred, and thus, this video portion may be reproduced in the fast motion.

Furthermore, the video file generated by encoding both the first frame group and the second frame group based on the first frame rate is a file generated at one same frame rate, and thus a general reproduction device which cannot reproduce variable frames may also reproduce the generated video file. Therefore, the photographing device 500 in the present embodiment may generate a video which is reproducible by all reproduction devices without separate encoding and of which a reproduction speed changes.

Figure 8:
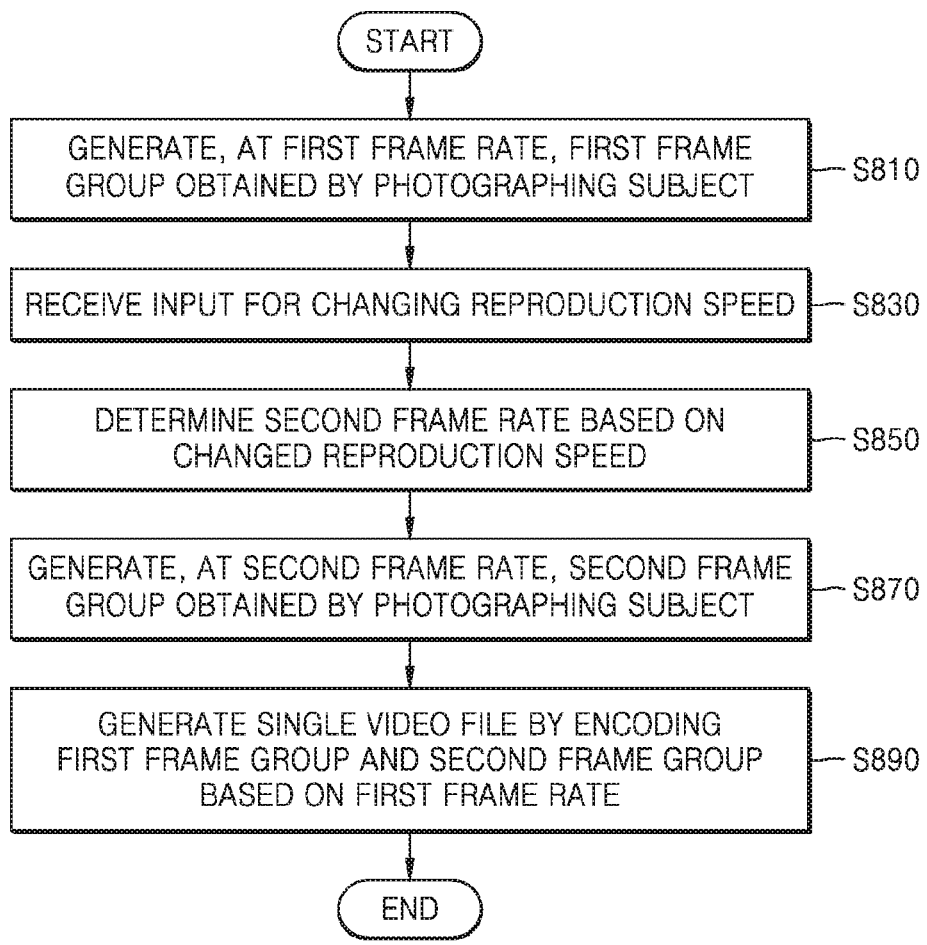
FIG. 8 is a flowchart of a method of controlling a photographing device for capturing a reproduction speed changing video, according to an embodiment of the present disclosure.

FIG. 8 is a flowchart of a method of controlling the photographing device 500 for capturing a reproduction speed changing video, according to an embodiment.

In operation S810, the photographing device 500 may generate, at the first frame rate, the first frame group obtained by photographing a subject. The first frame rate may be a default frame rate provided by the photographing device 500 or a default frame rate determined based on resolution of a video.

In operation S830, the photographing device 500 may receive an input for changing a reproduction speed. The input for changing the reproduction speed may be received automatically by a predetermined configuration or manually by a manipulation of the user.

The predetermined configuration may be determined based on photographing history data stored in a database or based on at least one of whether the subject moves, a moving speed of the subject, a moving direction of the subject, and whether a predetermined motion is detected.

The manually received input may be an input received through a volume control button or a touch input received through a touch screen.

In operation S850, the photographing device 500 may determine the second frame rate based on the changed reproduction speed. The second frame rate may be determined to be less than the first frame rate when the changed reproduction speed is faster than a previous reproduction speed and to be greater than the first frame rate when the changed reproduction speed is slower than the previous reproduction speed.

According to some embodiments, the photographing device 500 may previously configure the second frame rate according to the changed reproduction speed.

In operation S870, the photographing device 500 may generate, at the second frame rate, the second frame group obtained by photographing the subject. The photographing device 500 may capture a video at the first frame rate, determine the second frame rate based on a changed reproduction speed when an input for changing a reproduction speed is received, and continuously capture the video at the determined second frame rate. A set of frames generated for a time for which the video is captured at the second frame rate may be the second frame group.

In operation S890, the photographing device 500 may generate a single video file by encoding the first frame group and the second frame group based on the first frame rate. In the generated video file, a portion in which the first frame group generated at the first frame rate is encoded at the first frame rate may be reproduced at the normal reproduction speed to which an actual moving speed of the subject is reflected as it is. However, a portion in which the second frame group generated at the second frame rate is encoded at the first frame rate may be reproduced in the fast or slow motion.

According to some embodiments, the photographing device 500 may generate a video in which a reproduction speed change occurs two times or more. For example, a video generated according to an embodiment of the present specification may be reproduced at the normal speed, reproduced in the slow motion, reproduced at the normal speed again, and reproduced in the fast motion. In this case, the photographing device 500 may receive an input for changing a reproduction speed three times. Even in this case, the photographing device 500 may generate a single video file by encoding all frame groups captured at different reproduction speeds, based on one frame rate.

A reference frame rate in the encoding may be a frame rate of a photographing start time point, a frame rate received through a separate input, or the default frame rate configured in the photographing device 500.

Figure 9:
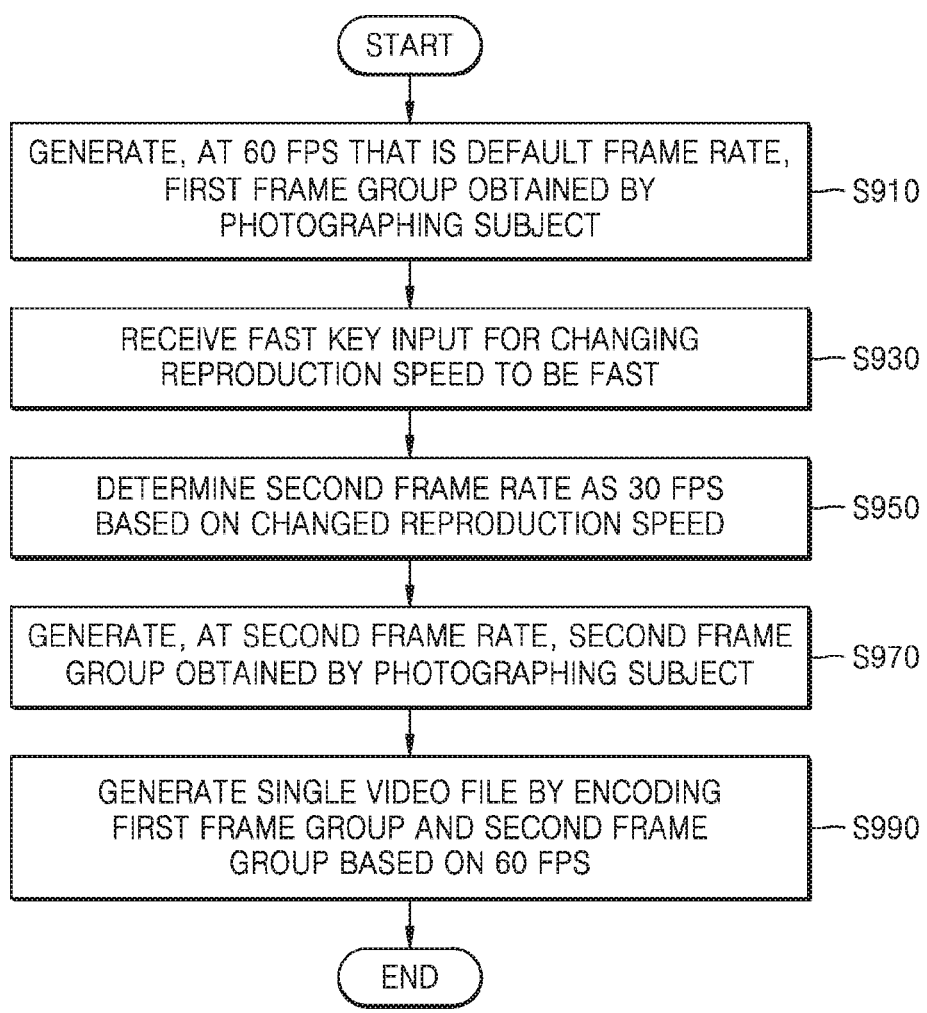
FIG. 9 is a flowchart of a method of controlling a photographing device for capturing a reproduction speed changing video, according to another embodiment of the present disclosure.

FIG. 9 is a flowchart of a method of controlling the photographing device 500 for capturing a reproduction speed changing video, according to another embodiment.

In operation S910, the photographing device 500 may generate the first frame group obtained by photographing a subject, at 60 FPS which is the default frame rate configured in the photographing device 500.

In operation S930, the photographing device 500 may receive a fast key input for changing a reproduction speed to the fast motion. The input for changing the reproduction speed may be received automatically by a predetermined configuration or manually by a manipulation of the user. The predetermined configuration may be determined based on photographing history data stored in a database or based on at least one of whether the subject moves, a moving speed of the subject, a moving direction of the subject, and whether a predetermined motion is detected. The manually received input may be an input received through a volume control button or a touch input received through a touch screen.

In operation S950, the photographing device 500 may determine the second frame rate as 30 FPS based on the changed reproduction speed. The second frame rate may be determined to be less than the first frame rate since the changed reproduction speed is faster than a previous reproduction speed.

According to some embodiments, the second frame rate may be determined as a preset value according to the changed reproduction speed.

In operation S970, the photographing device 500 may generate, at the second frame rate, the second frame group obtained by photographing the subject. The photographing device 500 may capture a video at the first frame rate, determine the second frame rate based on a changed reproduction speed when an input for changing a reproduction speed is received, and continuously capture the video at the determined second frame rate. Frames generated for a time for which the video is captured at the second frame rate may belong to the second frame group.

In operation S990, the photographing device 500 may generate a single video file by encoding the first frame group and the second frame group based on 60 FPS. In the generated video file, a portion in which the first frame group generated at 60 FPS is encoded at 60 FPS may be reproduced at the normal reproduction speed to which an actual moving speed of the subject is reflected as it is. However, a portion in which the second frame group generated at 30 FPS is encoded at 60 FPS may be reproduced in the fast motion.

Figure 10:
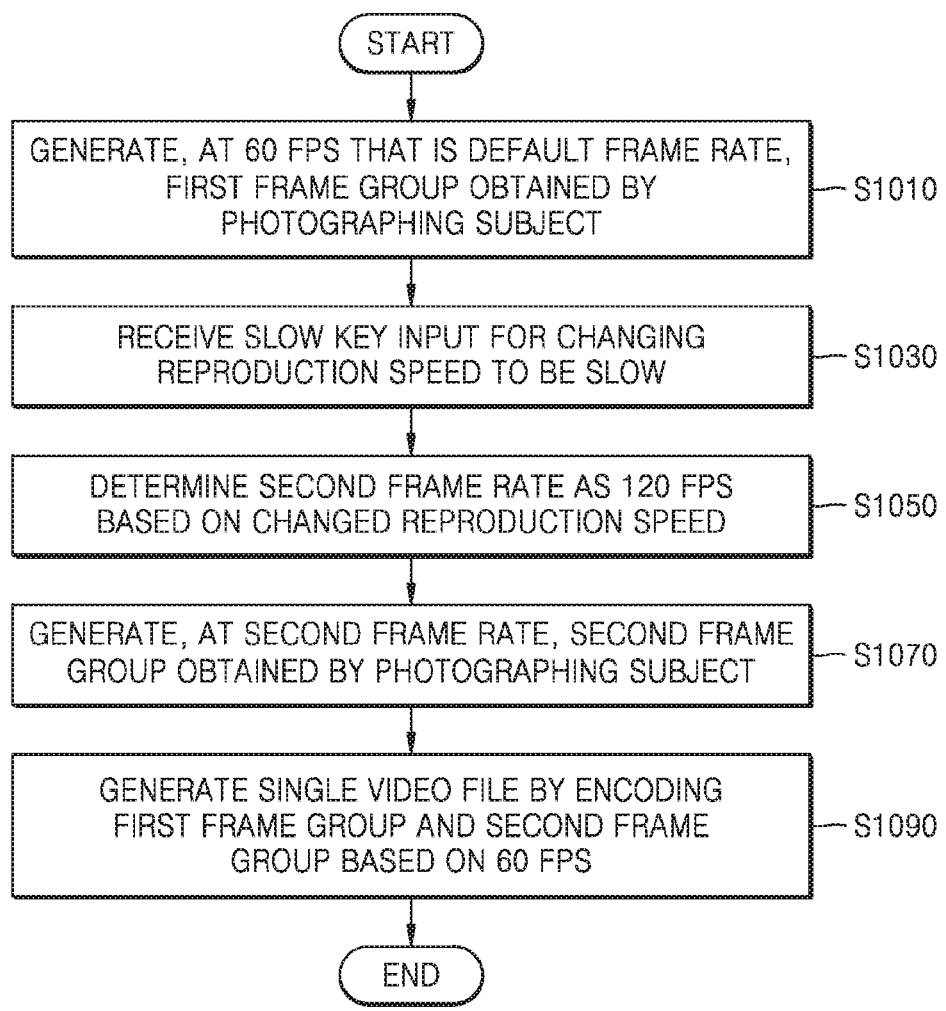
FIG. 10 is a flowchart of a method of controlling a photographing device for capturing a reproduction speed changing video, according to another embodiment of the present disclosure.

FIG. 10 is a flowchart of a method of controlling the photographing device 500 for capturing a reproduction speed changing video, according to another embodiment.

In operation S1010, the photographing device 500 may generate the first frame group obtained by photographing a subject, at 60 FPS which is the default frame rate of the photographing device 500.

In operation S1030, the photographing device 500 may receive a slow key input for changing a reproduction speed to the slow motion. The input for changing the reproduction speed may be received automatically by a predetermined configuration or manually by a manipulation of the user. The predetermined configuration may be determined based on photographing history data stored in a database or based on at least one of whether the subject moves, a moving speed of the subject, a moving direction of the subject, and whether a predetermined motion is detected. The manually received input may be an input received through a volume control button or a touch input received through a touch screen.

In operation S1050, the photographing device 500 may determine the second frame rate as 120 FPS based on the changed reproduction speed. The second frame rate may be determined to be greater than 60 FPS which is the default frame rate since the changed reproduction speed is slower than a previous reproduction speed.

According to some embodiments, the second frame rate may be determined as a preset value according to the changed reproduction speed.

In operation S1070, the photographing device 500 may generate, at the second frame rate, the second frame group obtained by photographing the subject. The photographing device 500 may capture a video at 60 FPS, determine the second frame rate as 120 FPS based on a changed reproduction speed when an input for changing a reproduction speed to the slow motion is received, and continuously capture the video at the determined second frame rate. Frames generated for a time for which the video is captured at the second frame rate may belong to the second frame group.

In operation S1090, the photographing device 500 may generate a single video file by encoding the first frame group and the second frame group based on 60 FPS. In the generated video file, a portion in which the first frame group generated at 60 FPS is encoded at 60 FPS may be reproduced at the normal reproduction speed to which an actual moving speed of the subject is reflected as it is. However, a portion in which the second frame group generated at 120 FPS is encoded at 60 FPS may be reproduced in the slow motion.

Figure 11:
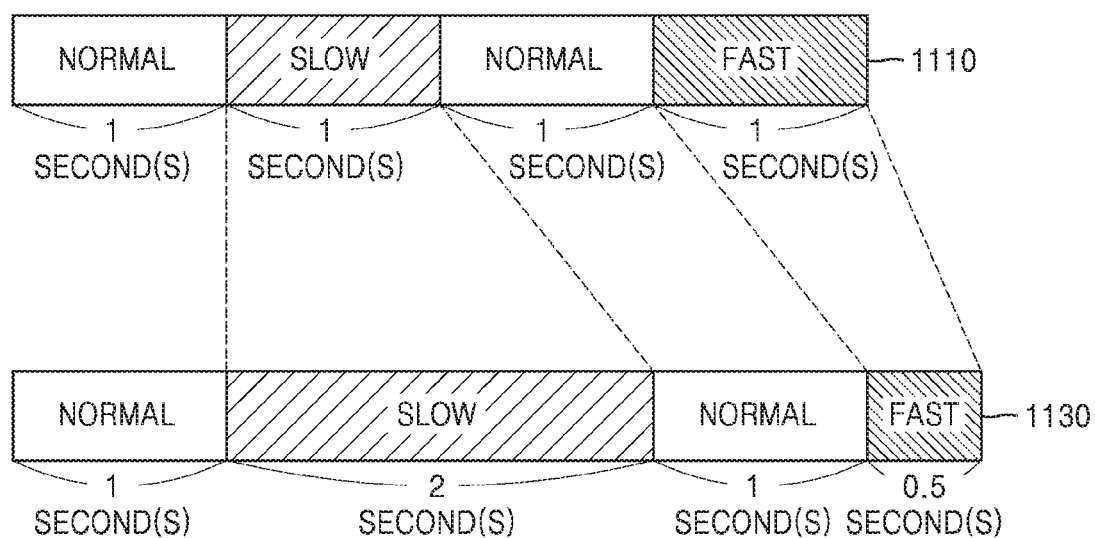
FIG. 11 illustrates a method by which a photographing device encodes generated frames, according to an embodiment of the present disclosure.

FIG. 11 illustrates a method by which the photographing device 500 encodes generated frames, according to an embodiment.

The photographing device 500 may photograph a subject at the normal speed for one second, photograph the subject in the slow motion for next one second, photograph the subject at the normal speed for next one second again, and photograph the subject in the fast motion for next one second (1110).

When the photographing device 500 encodes the frames captured in the method described above based on the normal speed, the frames captured for first one second may be encoded so as to be reproduced for one second, the frames captured in the slow motion for next one second may be encoded so as to be reproduced for two seconds, the frames captured at the normal speed for next one second may be encoded so as to be reproduced for one second, and the frames captured in the fast motion for next one second may be encoded so as to be reproduced for 0.5 seconds (1130).

That is, a video captured for four seconds (1110) may be encoded (1130) to a video file to be reproduced for 4.5 seconds.

For example, it may be assumed that a frame rate of the photographing device 500 is 60 FPS for the normal reproduction speed, 120 FPS for a slow motion of a double speed, and 30 FPS in a fast motion of a double speed.

In this case, the reason why the frames captured in the slow motion for one second are encoded so as to be reproduced for two seconds is because the number of frames captured in the slow motion, i.e., at a high frame rate, for one second is 120 that is two times the number of frames, 60, captured at the normal speed and two seconds are taken to reproduce 120 frames since only 60 frames are reproduced for one second when the 120 frames are encoded at 60 FPS.

In contrast, the reason why the frames captured in the fast motion for one second are encoded so as to be reproduced for 0.5 seconds is because the number of frames captured in the fast motion, i.e., at a low frame rate, for one second is 30 that is half the number of frames captured at the normal speed and only 0.5 seconds are taken to reproduce 30 frames since 60 frames are reproduced for one second when the 30 frames are encoded at 60 FPS.

Figure 12:
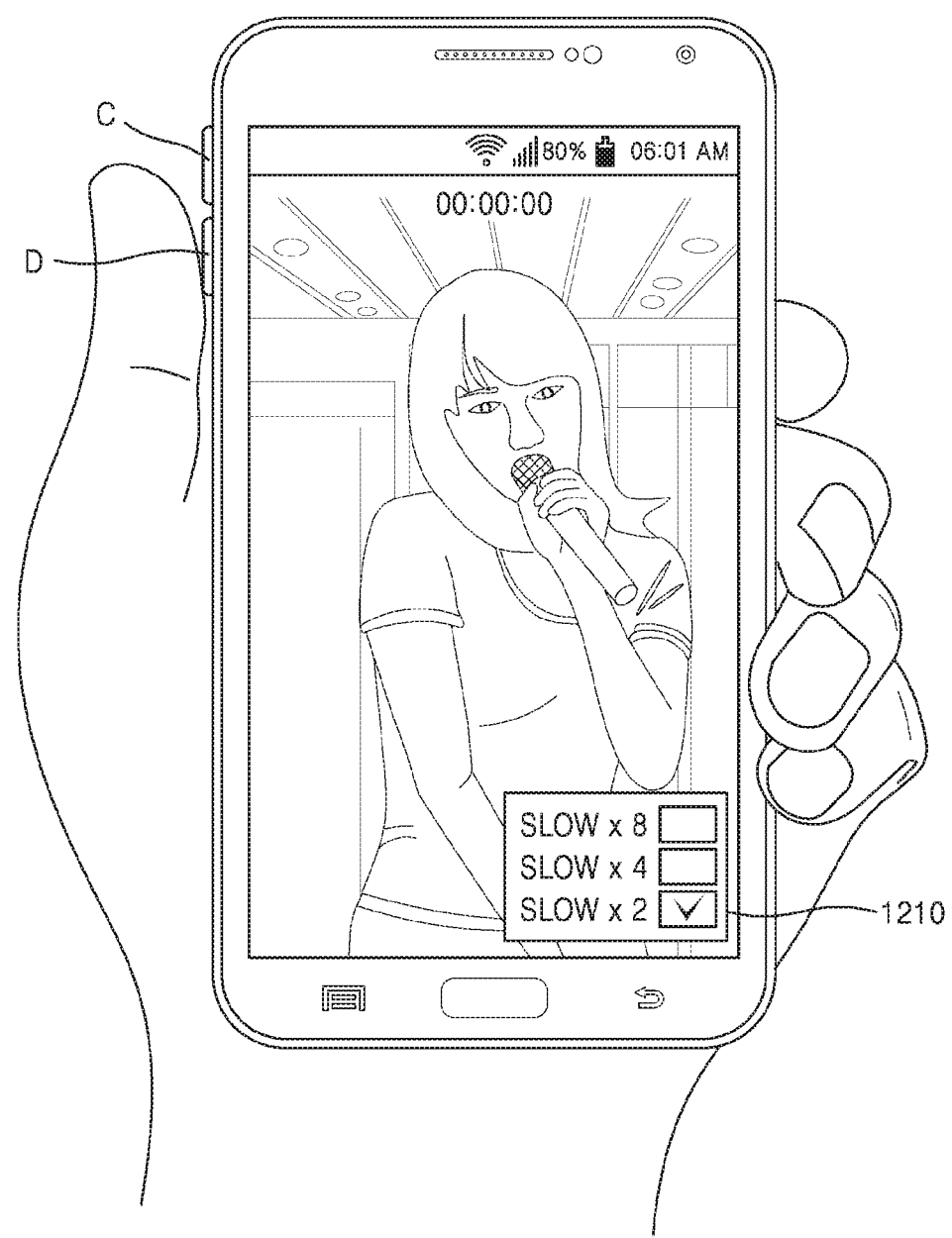
FIG. 12 illustrates a method by which a photographing device manually receives an input of a reproduction speed, according to an embodiment of the present disclosure.

FIG. 12 illustrates a method by which the photographing device 500 manually receives an input for a reproduction speed, according to an embodiment.

When the photographing device 500 is a smartphone, an input for changing a reproduction speed may be manually received by a manipulation of the user. For example, the photographing device 500 may change the reproduction speed by receiving an input of the user on a volume control button C or D.

According to an embodiment, when an input on the volume up button C is received, the photographing device 500 may photograph a subject in a fast motion, and if an input on the volume down button D is received, the photographing device 500 may photograph the subject in a slow motion.

For example, when an input on the volume up button C is received once while the photographing device 500 is capturing a video at the normal reproduction speed, the photographing device 500 may photograph a subject in a fast motion of a double speed, and when an input on the volume up button C is received two times while the photographing device 500 is capturing a video at the normal reproduction speed, the photographing device 500 may photograph the subject in a fast motion of a four-times speed. Thereafter, if an input on the volume up button C is further received, the photographing device 500 may photograph the subject in a fast motion of an 8-times speed, a 16-times speed, or the like.

In addition, when an input on the volume down button D is received once while the photographing device 500 is capturing a video at the normal reproduction speed, the photographing device 500 may photograph a subject in a slow motion of a double speed, and when an input on the volume down button D is received two times while the photographing device 500 is capturing a video at the normal reproduction speed, the photographing device 500 may photograph the subject in a slow motion of a four-times speed. Thereafter, if an input on the volume down button D is further received, the photographing device 500 may photograph the subject in a slow motion of an 8-times speed, a 16-times speed, or the like.

The photographing device 500 may display a configuration state 1210 of a current reproduction speed on a screen.

Figure 13:
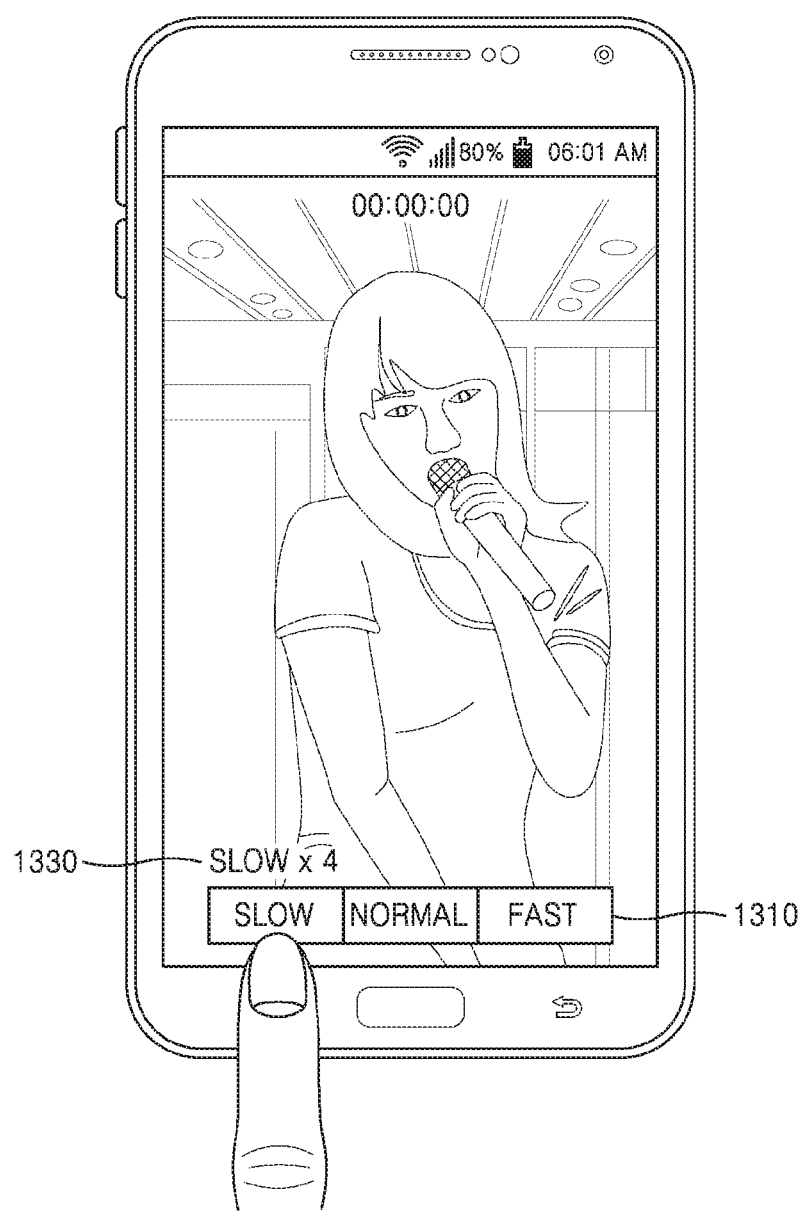
FIG. 13 illustrates a method by which a photographing device manually receives an input of a reproduction speed, according to another embodiment of the present disclosure.

FIG. 13 illustrates a method by which the photographing device 500 manually receives an input for a reproduction speed, according to another embodiment.

When the photographing device 500 is a smartphone, an input for changing a reproduction speed may be manually received by a manipulation of the user. The photographing device 500 may change the reproduction speed by receiving a touch input of the user on a touch screen.

According to an embodiment, the photographing device 500 may display a reproduction speed configuration menu 1310 on the screen. When a touch input on a slow button of the reproduction speed configuration menu 1310 is received, the photographing device 500 may photograph a subject in a slow motion, and when a touch input on a fast button is received, the photographing device 500 may photograph the subject in a fast motion.

For example, when an input on the fast button is received once while the photographing device 500 is capturing a video at the normal reproduction speed, the photographing device 500 may photograph the subject in a fast motion of a double speed, and when an input on the fast button is received two times while the photographing device 500 is capturing a video at the normal reproduction speed, the photographing device 500 may photograph the subject in a fast motion of a four-times speed. Thereafter, if an input on the fast button is further received, the photographing device 500 may photograph the subject in a fast motion of an 8-times speed, a 16-times speed, or the like.

In addition, when an input on the slow button is received once while the photographing device 500 is capturing a video at the normal reproduction speed, the photographing device 500 may photograph the subject in a slow motion of a double speed, and when an input on the slow button is received two times while the photographing device 500 is capturing a video at the normal reproduction speed, the photographing device 500 may photograph the subject in a slow motion of a four-times speed. Thereafter, if an input on the slow button is further received, the photographing device 500 may photograph the subject in a slow motion of an 8-times speed, a 16-times speed, or the like.

The photographing device 500 may display a configuration state 1330 of a current reproduction speed on the screen.

Figure 14:
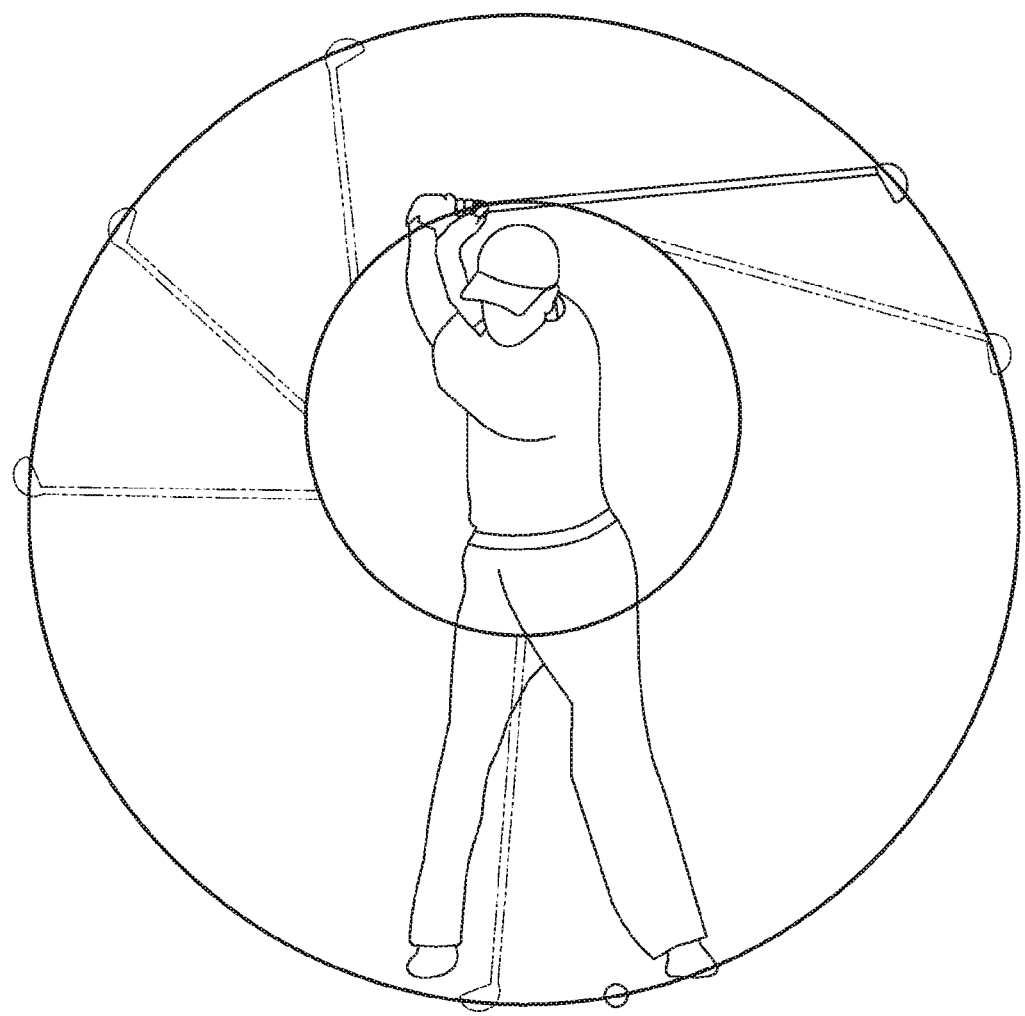
FIG. 14 illustrates a method by which a photographing device automatically receives an input of a reproduction speed, according to an embodiment of the present disclosure.

FIG. 14 illustrates a method by which the photographing device 500 automatically receives an input for a reproduction speed, according to an embodiment. While the photographing device 500 is capturing a video, an input for changing a reproduction speed may be automatically received by a predetermined configuration.

For example, when the photographing device 500 photographs a golf swing scene, the photographing device 500 may determine, based on photographing history data stored in a database, that there is a high probability that the user photographs, in a slow motion, an impact moment of hitting a ball by a golf club. Therefore, the photographing device 500 may capture a golf swing video at the normal speed and change the reproduction speed to a slow motion near the impact moment.

In addition, the photographing device 500 may adjust the reproduction speed based on at least one of whether a subject moves, a moving speed of the subject, a moving direction of the subject, and whether a predetermined motion is detected. For example, the photographing device 500 may adjust the reproduction speed such that the golf swing video is captured in the slow motion from a time point where a moving direction of the golf club is changed from an upward oval shape to a downward oval shape. This is based on the fact that a common golf swing motion is performed by holding a golf club up to a back swing top, then changing a direction, and swinging the golf club down.

According to some embodiments, the photographing device 500 may previously configure a time point of photographing in a slow or fast motion. This configuration may be achieved through a time table predetermined according to circumstances. For example, when the photographing device 500 photographs a golf swing, the photographing device 500 may configure such that the golf swing is photographed in the slow motion from five seconds after a photographing start time point. The slow motion photographing started by the configuration may be maintained for a predetermined time or until an additional key input is received. When the predetermined time elapses or an additional key input is received, the photographing device 500 may adjust a reproduction speed to the normal speed again. As such, when a specific video is captured by configuring the reproduction speed to be automatically changed, the user may view the video captured in the slow motion only for a portion of interest without an additional input activity, thereby feeling convenience.

A photographing device for capturing a reproduction speed changing video which is reproducible in all devices without an additional encoding job and a control method thereof may be provided.

The present embodiments may be implemented by storing computer-readable code in a non-transitory computer-readable storage medium. The non-transitory computer-readable storage medium is any data storage device that can store data that can thereafter be read by a computer system.

The computer-readable code is configured to perform operations implementing a photographing device control method according to an embodiment when the computer-readable code is read, from the non-transitory computer-readable storage medium, and executed by a processor. The computer-readable code may be implemented by various programming languages. Also, functional programs, codes and code segments for embodying the present embodiments may be easily programmed by those of ordinary skill in the art to which the present embodiments belong.

Examples of the non-transitory computer-readable storage medium include ROMs, RAMs, CD-ROMs, magnetic tapes, floppy disks, optical data storage devices, etc.

It should be understood that embodiments described herein should be considered in a descriptive sense only and not for purposes of limitation. Descriptions of features or aspects within each embodiment should typically be considered as available for other similar features or aspects in other embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating an electronic device, the method comprising:
   generating, at a first frame rate, a first frame group obtained by photographing a subject;
   receiving an input for changing a reproduction speed;
   determining a second frame rate based on the changed reproduction speed;
   generating, at the second frame rate, a second frame group obtained by photographing the subject; and
   generating a single video file including two different reproduction speeds by encoding, at a single frame rate, the first frame group and the second frame group,
   wherein the first frame group and the second frame group are encoded in a single step together based on the single frame rate,
   wherein the generated video file is reproducible without encoding and a reproduction speed of the generated video file changes during a reproduction,
   wherein the input is an input received through a volume control button or a touch screen and is configured to vary the reproduction speed according to a predetermined value in response to each of a number of inputs.

2. The method of claim 1, wherein determining the second frame rate comprises:
   in response to the changed reproduction speed being faster than a previous reproduction speed, determining the second frame rate to be less than the first frame rate, and
   in response to the changed reproduction speed being slower than the previous reproduction speed, determining the second frame rate to be greater than the first frame rate.

3. The method of claim 1, wherein the second frame rate is determined as a preset value based on the changed reproduction speed.

4. The method of claim 1, wherein the input for changing the reproduction speed is received manually in response to a manipulation by a user.

5. The method of claim 4, wherein the manually received input is an input received through a volume control button.

6. The method of claim 4, wherein the manually received input is a touch input received through the touch screen.

7. The method of claim 1, wherein the first frame rate is a default frame rate provided by the electronic device.

8. The method of claim 1, wherein the first frame rate is a default frame rate determined based on a resolution of the generated video.

9. An electronic device comprising:
   an input device configured to receive an input for changing a reproduction speed, the input device comprising a volume control button or touch screen; and
   a processor configured to:
      generate, at a first frame rate, a first frame group obtained by photographing a subject,
      determine a second frame rate based on the changed reproduction speed,
      generate, at the second frame rate, a second frame group obtained by photographing the subject, and
      generate a single video file including two different reproduction speeds by encoding, at a single frame rate, the first frame group and the second frame group,
   wherein the first frame group and the second frame group are encoded together based on the single frame rate,
   wherein the generated video file is reproducible without encoding and a reproduction speed of the generated video file changes during a reproduction, and
   wherein is the input received through the input device and is configured to vary the reproduction speed according to a predetermined value in response to each of a number of inputs.

10. The electronic device of claim 9, wherein
   in response to the changed reproduction speed being faster than a previous reproduction speed, determining the second frame rate is determined to be less than the first frame rate, and
   in response to the changed reproduction speed being slower than the previous reproduction speed, determining the second frame rate to be greater than the first frame rate.

11. The electronic device of claim 9, wherein the second frame rate is determined as a preset value based on the changed reproduction speed.

12. The electronic device of claim 9, wherein the input for changing the reproduction speed is received manually in response to a manipulation by a user.

13. The electronic device of claim 12, wherein the manually received input is received through the volume control button.

14. The electronic device of claim 12, wherein the manually received input is the touch input received through a touch screen.

15. The electronic device of claim 9, wherein the first frame rate is a default frame rate provided by the electronic device.

16. A non-transitory computer-readable recording medium having recorded thereon a computer-readable program configured to, when executed by one or more processors, cause the one or more processors to:
   generate, at a first frame rate, a first frame group obtained by photographing a subject;
   receive, an input for changing a reproduction speed;
   determine a second frame rate based on the changed reproduction speed;
   generate, at the second frame rate, a second frame group obtained by photographing the subject; and generate a single video file including two different reproduction speeds by encoding, at a single frame rate, the first frame group and the second frame group, wherein the first frame group and the second frame group are encoded together based on the single frame rate, wherein the generated video file is reproducible without encoding and a reproduction speed of the generated video file changes during a reproduction, wherein the input is an input received through a volume control button or a touch screen and is configured to vary the reproduction speed according to a predetermined value in response to each of a number of inputs.

* * * * *